March 3, 1964 J. M. RHOADES 3,122,970

TRACING DEVICE

Filed Jan. 14, 1960 2 Sheets-Sheet 1

INVENTOR:
JOHN M. RHOADES,

BY James J. Williams
HIS ATTORNEY.

INVENTOR:
JOHN M. RHOADES,
BY James J. Williams
HIS ATTORNEY.

United States Patent Office 3,122,970
Patented Mar. 3, 1964

3,122,970

TRACING DEVICE

John M. Rhoades, Waynesboro, Va., assignor to General Electric Company, a corporation of New York Filed Jan. 14, 1960, Ser. No. 2,467
8 Claims. (Cl. 90—62)

The invention relates to a tracing device and particularly to a tracing device that is capable of tracing contours in three dimensions and producing signals for use in a control system.

An object of the invention is to provide an improved tracing device.

Another object of the invention is to provide a novel tracing device that has only a single stylus but that is capable of tracing contours in three dimensions.

Another object of the invention is to provide a novel tracing device that is capable of simultaneously generating control signals in three dimensions, the control signals being indicative of the contours traced and being for use in a control system.

Another object of the invention is to provide a novel tracing device that has only one stylus but that is capable of tracing contours in three dimensions and simultaneously generating signals that are indicative of the contours traced and that may be used in a control system.

Briefly, in accordance with one embodiment of the invention, the tracing device comprises a single elongated stylus that consists of two parts. Support means are fastened to the first part of the stylus to support the stylus and to only permit the first part to move along or longitudinally with respect to the longitudinal axis of the stylus. However, the support means permit the second part of the stylus to move both longitudinally and transversely with respect to the longitudinal axis. A first magnetic circuit is positioned in the vicinity of the first part of the stylus and a second magnetic circuit is positioned in the vicinity of the second part of the stylus. A first armature is fastened to the first part of the stylus to change the reluctance of the first magnetic circuit in response to motion of the stylus along the longitudinal axis. A second armature is fastened to the second part of the stylus to change the reluctance of the second magnetic circuit in response to motion of the stylus in transverse directions with respect to the longitudinal axis. Suitable circuitry may be coupled to the magnetic circuits for producing signals in response to changes in the magnetic circuit reluctance, and these signals may be utilized in any way desired, such as their application to a control system.

The invention will be better understood from the following description taken in connection with the accompanying drawing, and its scope will be pointed out in the claims. In the drawing:

Figures 1, 2:
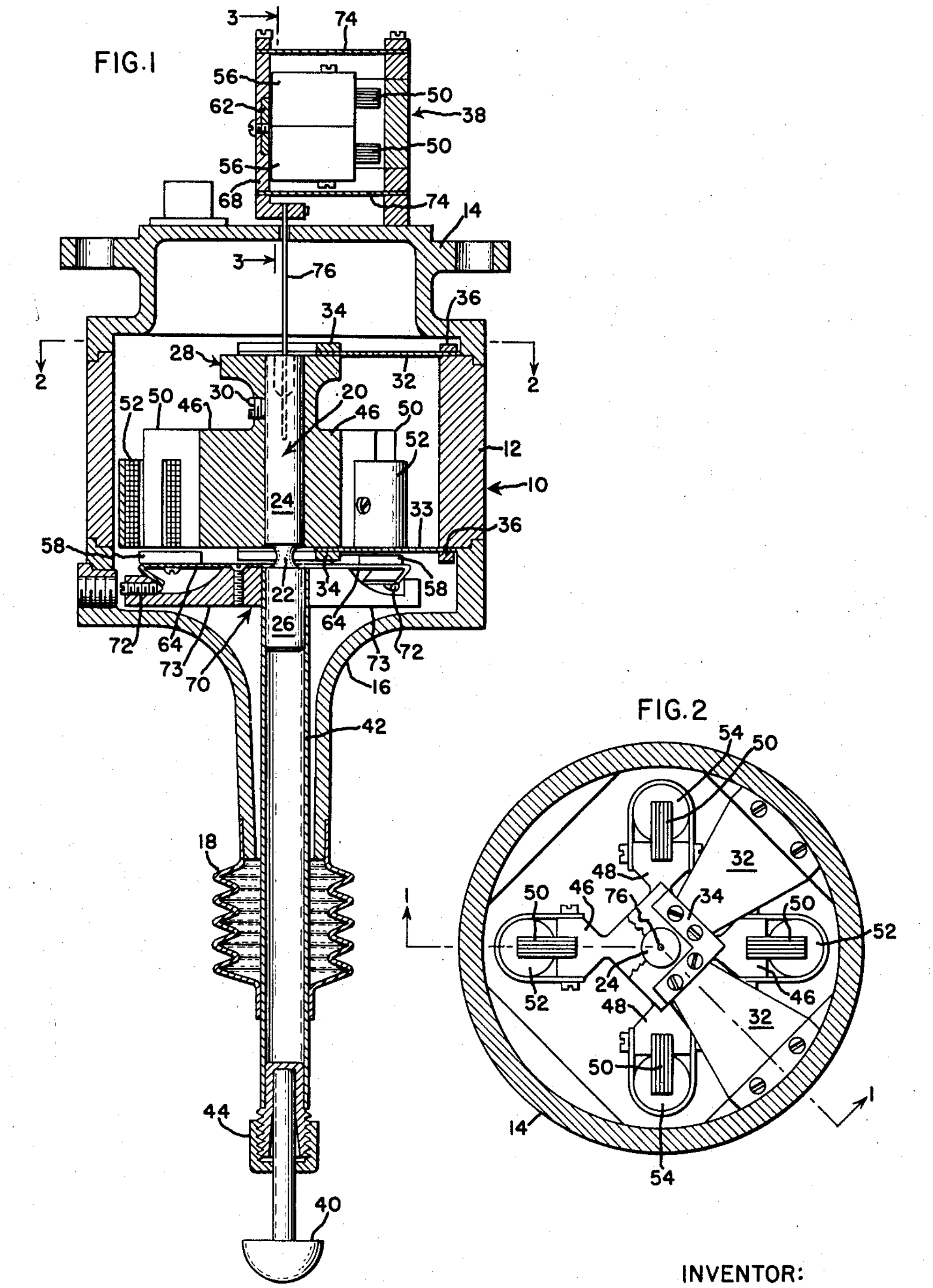
FIGURE 1 is a longitudinal cross-sectional view of a preferred embodiment of the tracing device, the view of FIGURE 1 being taken along the radial lines 1—1 in FIGURE 2.
FIGURE 2 is a transverse cross-sectional view taken along the lines 2—2 in FIGURE 1.

As shown in the figures of the drawing, and particularly in FIGURE 1, the tracing device comprises a hollow cylindrical housing 10. The housing 10 may be made up of a central portion 12, an upper cap or covering 14, and a lower cap or covering 16. The central portion 12, the upper cap 14, and the lower cap 16 may be machined with suitable flanges as shown to provide a tight housing. The lower cap 16 may be tapered inwardly as shown, and provided with a bellows-like structure 18 which provides a flexible yet tight covering between the stylus 20 and its opening. The stylus 20 is centrally and axially positioned within the housing 10 and may be comprised of an elongated cylindrical rod made of some material such as spring steel having a low mechanical hysteresis. Between the ends of the stylus 20 is a reduced area or necked-down portion 22 which divides the stylus 20 into a first part 24 and a second part 26. An X and Y coil frame 28 surrounds the first part 24 of the stylus 20, and is rigidly fastened thereto by any suitable means such as a set screw 30. As will be explained hereinafter, the X and Y coil frame 28 supports X and Y magnetic cores and coils which form the X and Y magnetic circuits. The X and Y coil frame 28 is also fastened to and supported by the central portion 12 of the housing 10 by means of two flat spring-like upper elements 32 positioned in a common plane transverse to the longitudinal axis of the stylus 20, and two similar lower spring-like elements 33 positioned in a common plane parallel to the upper spring-like elements 32. The springlike elements 32, 33 are rigidly fastened at one end to the X and Y coil frame 28 by means of suitable frame plates 34 which are screwed or fastened to the X and Y coil frame 28 by any suitable means. The other ends of the spring-like elements 32, 33 are fastened to a flat ledge or flange on the central portion 12 of the housing 10 by suitable housing plates 36 which are also screwed or fastened to the central portion 12 by any suitable means. The four spring-like elements 32, 33 are preferably similar in characteristics and configuration. As shown in FIGURE 2, the upper spring-like elements 32 are positioned with their axes at right angles to each other, and the lower spring-like elements 33 are similarly positioned beneath the upper spring-like elements 32. This arrangement provides a support structure for the X and Y coil frame 28 that permits the X and Y coil frame 28 to be moved longitudinally along the longitudinal axis of the stylus 20, and at the same time, prevents the X and Y coil frame 28 and the first part 24 of the stylus 20 from moving in transverse directions with respect to the longitudinal axis of the stylus 20. While not essential or necessary, it is preferred that the spring-like elements 32, 33 be positioned directly above and below each other and with their axes 90 degrees apart as shown in FIGURE 2 because this arrangement provides a relatively rugged structure that prevents the X and Y coil frame 28 from being moved in a transverse direction. At the same time, it permits free motion of the X and Y coil frame 28 along the longitudinal axis with a spring constant equal to the spring constant of the stylus 20 in a transverse direction with respect to the longitudinal axis, both spring constants being measured at the center of the tracing tip of the stylus 20. Thus, a given force applied on the tracing tip of the stylus 20 will produce a substantially constant deflection for any direction of the applied force. A Z coil frame 38 is rigidly fastened to the top of the upper cap 14 by any suitable means such as screws. As will be explained hereinafter, the Z coil frame 38 supports Z magnetic cores and coils which form the Z magnetic circuit.

The second part 26 of the stylus 20 is integrally connected to a tracing tip 40 by an extension 42. The tracing tip 40 may have any desired shape or configuration depending upon the type of contour, machine cutter, or tracing template to be used. The extension 42 of the second part 26 of the stylus 20 may be a cylindrical tube as shown, the extension 42 preferably being made hollow to save weight. It has been found that a hollow extension 42 performs satisfactorily. This extension 42 may be fastened to the second part 26 of the stylus by any suitable means, such as by a force or press fit or by welding, and may be provided with a suitable chuck 44 which permits tracing tips to be easily changed if desired. The extension 42 and the second part 26 of the stylus 20 pivot about the necked-down portion 22 of the stylus 20 in response to transverse movement of the tracing tip 40.

Figure 4:
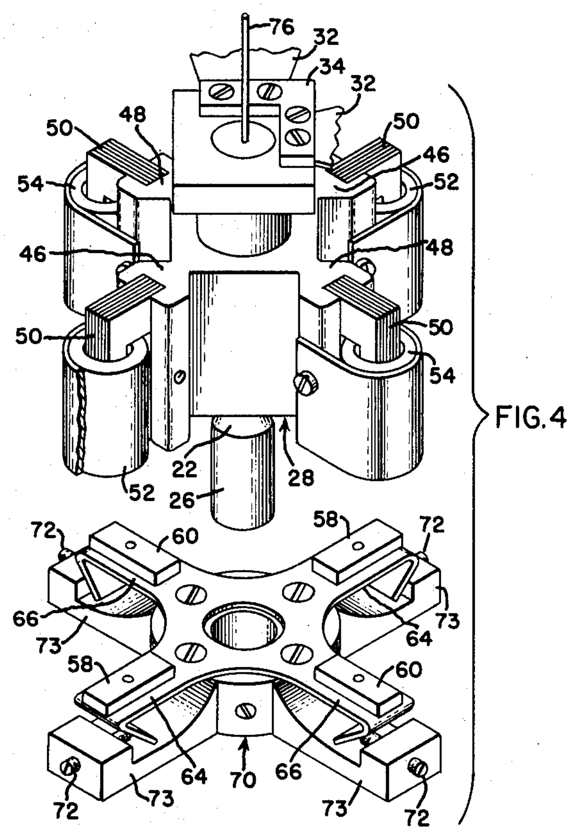
FIGURE 4 is an exploded perspective view that shows details of certain elements of the tracing device.

The magnetic circuit arrangement of the tracing device will now be discussed in greater detail. The X and Y coil frame 28 includes four radial arms 46, 48, two of these radial arms 46 being associated with the X magnetic circuit, and the other two of these radial arms 48 being associated with the Y magnetic circuit. The X radial arms 46 are positioned along one diameter with respect to the longitudinal axis of the stylus 20, and the Y radial arms 48 are positioned along another diameter with respect to the longitudinal axis of the stylus 20. As seen in FIGURES 2 and 4, these diameters are mutually perpendicular to each other. Each of the radial arms 46, 48 of the X and Y coil frame 28 carries a U-shaped magnetic core 50 positioned with the ends of the U pointing downward. Associated with each of the magnetic cores 50 on the X radial arms 46 is an X coil 52. Associated with each of the magnetic cores 50 on the Y radial arms 48 is a Y coil 54. The X and Y coils 52, 54 are positioned around one of the legs of their respective magnetic cores 50. The leads or ends of the X and Y coils 52, 54 may be suitably brought out for connection to external circuitry which will be explained. Likewise, the Z coil frame 38 carries two U-shaped magnetic cores 50, these magnetic cores 50 being positioned with their planes parallel to each other and with their planes transverse to the longitudinal axis of the stylus 20, and with the ends of the U pointing in the same direction. Associated with each of these magnetic cores 50 is a Z coil 56 which is positioned around one of the legs of each of the magnetic cores 50. The leads or ends of the Z coils 56 may be suitably brought out for connection to external circuitry which will be explained. While the respective X, Y, and Z coils 52, 54, 56 have been given different numbers, it is to be understood that these coils may be and preferably are similar in characteristics and construction.

Respectively associated with each set of X coils 52, Y coils 54, and Z coils 56 are two X armatures 58, two Y armatures 60, and one Z armature 62. The X and Y armatures 58, 60 are similar to each other and are respectively carried by X and Y radial arms 64, 66 of an X and Y armature frame 70. These radial X and Y arms 64, 66 extend along respective diameters in a plane transverse to the longitudinal axis of the stylus 20 and are positioned so that their X and Y armatures 58, 60 are located in the vicinity of their respective X and Y magnetic cores 50 and coils 52, 54. The X and Y armature frame 70 is securely fastened to the second part 26 of the stylus 20 just beneath the necked-down portion 22. The X and Y armature frame 70 thus moves with the second part 26 of the stylus 20 as do the X and Y radial arms 64, 66 and the X and Y armatures 58, 60. It is preferred that the X and Y armatures 58, 60 be similarly positioned with respect to their respective X and Y coils 52, 54 and cores 50, and for this purpose, set screws 72 in adjustment arms 73 are provided to adjust these armatures 58, 60 accordingly. As can be seen in FIGURE 2, the diameter of one of the radial arms (the X radial arms 46, 64 in this case) bisects the angle formed by the radial axes of the spring-like elements 32, 33. This is preferred because it provides the maximum clearance between the lower spring-like elements 33 and between the X and Y radial arms 46, 48, the X and Y coils 52, 54 and cores 50, and the X and Y armatures 58, 60.

The single Z armature 62 is also positioned adjacent to or in the vicinity of its respective cores 50 and Z coils 56 by means of a Z arm 68. Since only a single Z armature 62 is used in connection with the Z coils 56 and cores 50, the Z armature 62 is larger than the X and Y armatures 58, 60. The Z arm 68 is positioned and held for longitudinal movement with respect to the longitudinal axis of the stylus 20 by means of two flat supporting spring-like elements 74 which are positioned in parallel planes transverse to the longitudinal axis of the stylus 20. The Z spring-like elements 74 are rigidly fastened at one end to the Z coil frame 38 by means of suitable plates and screws, or by any other convenient method of fastening. The other ends of the Z spring-like elements 74 are fastened to the Z armature arm 68 in a similar manner. A Z connecting arm 76 is rigidly secured between the first part 24 of the stylus 20 and the Z armature arm 68 so as to transmit longitudinal movement of the stylus 20 to the Z armature arm 68 and armature 62. The Z connecting arm 76 may be made of some small wire-like element which, while of sufficient strength to transmit longitudinal movement, is too weak to transmit any transverse movement with respect to the longitudinal axis of the stylus 20. This feature further insures against transverse movement of the Z armature 62. A steel cover (not shown) is preferably placed over the Z apparatus just described and fastened to the upper cap 14 to protect this apparatus and shield it from magnetic fields.

The tracing device as thus far described will be seen to include three magnetic circuits for the X, Y, and Z motions, each magnetic circuit having a pair of U-shaped cores, a coil wound on each core, and an armature associated with each core. However, only one Z armature 62 is provided for the two Z cores 50. While the magnetic circuits need not all be electrically and mechanically similar, it is preferred that they be electrically and mechanically similar so as to provide signals which can be related in terms of magnitude and characteristics. Normally (that is with no deflection of the stylus), the respective halves of the X, Y, and Z magnetic circuits have their own equal circuit values, so that the reluctance of each of the X, Y, and Z magnetic circuits is balanced. It is preferable that these equal circuit values all be equal to each other so as to be electrically interchangeable in a circuit. The reluctance balance of each of the magnetic circuits may be changed or upset by changing the physical position of the armatures with respect to the coils and cores. Thus, the reluctance balance of the Z magnetic circuit is changed by longitudinal movement of the stylus 20 moving the single Z armature 62 with respect to the Z coils 56 and Z cores 50. Likewise, the reluctance balance of the X or Y magnetic circuits is changed by transverse movement of the second part 26 of the stylus 20 moving the X or Y armatures 58, 60 with respect to the X or Y coils 52, 54 and X or Y cores 50.

Figure 3:
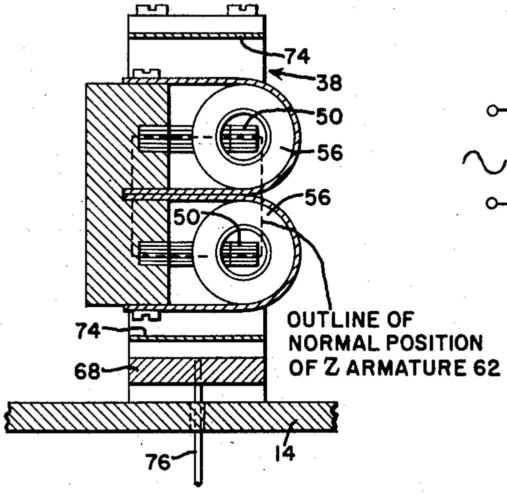
FIGURE 3 is a longitudinal cross-sectional view of a portion of the embodiment of FIGURE 1 taken along the lines 3—3.
Figure 5:
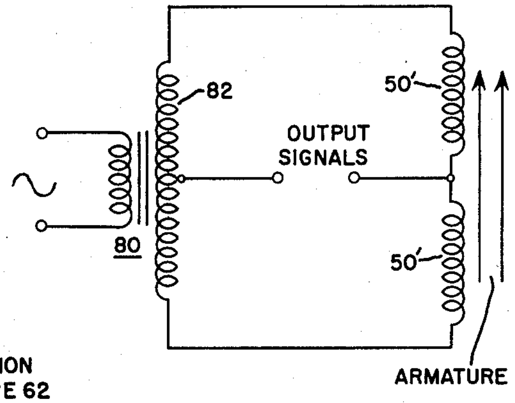
FIGURE 5 is a schematic diagram of an example of the electrical circuitry of the tracing device.

As previously mentioned, the upper and lower spring-like elements 32, 33 permit the stylus extension 42 and the second part 26 of the stylus 20 to be moved in transverse directions with respect to the first part 24 of the stylus 20 and cause no corresponding transverse movement of the first part 24 of the stylus 20, or of the X and Y coil frame 28, or of any of the elements associated with the Z magnetic circuit. This is also made possible by means of the necked-down portion 22. The necked-down portion 22 is so designed that it transmits longitudinal movement from the second part 26 to the first part 24 of the stylus 20, and so that it permits the second part 26 and the extension 42 to bend or flex about the necked-down portion 22 without transmitting transverse movement from the second part 26 to the first part 24 of the stylus 20. However, any transverse movement of the first part 24 of the stylus 20 which may be present is prevented from reaching the elements associated with the Z magnetic circuit because of the weak or zero transmission of transverse movement by the Z connecting arm 76. Thus, as the tracing tip 40, in following a contour, moves transversely, it causes the X and Y armature frame 70 to also move or bend or pivot about the necked-down portion 22. As the X and Y armature frame 70 so moves, it changes the reluctance balance of the respective X and Y magnetic circuits, and this change in reluctance balance may be utilized in a manner which will be explained to provide a signal for use in a control system. If, as viewed in FIGURE 1, the tracing tip 40 moves transversely only in the plane of the drawing (that is left and right), then only the reluctance balance of the X magnetic circuit will be affected or changed. This is because one X coil 52 and core 50 have an armature 58 relatively close and the other X coil 52 and core 50 have an X armature 58 relatively far away. The reluctance balance of the Y magnetic cirnetic circuit will not be changed under these conditions. Similarly, if the tracing tip 40 moves transversely only in a plane perpendicular to the plane of the drawing (that is toward and away from the viewer), then only the Y magnetic circuit will be affected. Movement in both transverse directions will affect the reluctance balance of both the X and Y magnetic circuits. However, such transverse movement does not affect the Z magnetic circuit as very little, if any, transverse movement passes through the necked-down portion 22, and substantially no transverse movement passes through the Z connecting arm 76. However, if the tracing tip 40 is moved longitudinally along the longitudinal axis of the stylus 20, the necked-down portion 22 and the Z connecting arm 76 will transmit this movement to the Z magnetic circuit to change its reluctance. Longitudinal movement of the tracing tip 40 along the longitudinal axis of the stylus 20 produces no change of the reluctance balance of the X and Y magnetic circuits. This results from the fact that each of the X and Y magnetic circuits comprises two cores, two coils, and two armatures which move together for longitudinal motion of the stylus 20. But if longitudinal motion of the stylus 20 does change the reluctance of the X and Y magnetic circuits, it changes both halves by the same amount, and this change (either a decrease or increase) of both halves leaves a net difference change of zero. That is, the reluctance remains balanced. This may be understood by reference to FIGURE 5, which shows an equivalent electrical circuit of a magnetic circuit representative of either the X, or the Y, or the Z magnetic circuit. As shown in FIGURE 5, the coils 50 are represented as 50′, and are connected together across a suitable supply of alternating current potential in a conventional bridge network or circuit. The supply of alternating current potential may be in the form of a transformer 80 having a center tapped secondary 82. The output signals from the magnetic circuit are derived from terminals which are respectively connected to the center tap of the transformer secondary 82 and to the center of the two coils 50′. The armatures are represented schematically by the lines having arrowheads to indicate that they may be changed or moved. If, as mentioned, the tracing tip 40 moves upward along the longitudinal axis of the stylus 20, the reluctances of both cores of both the X and Y magnetic circuits are changed by the same amount, thus still providing a reluctance balance. Thus, the X and Y bridge networks remain balanced and no output signal is produced. However, this upward movement of the tracing tip 40 causes the Z armature 62 to increase the reluctance of the lower Z magnetic circuit and to decrease the reluctance of the uper Z magnetic circuit. This can be understood by reference to FIGURES 1 and 3. As the tracing tip 40 is moved upward, the single Z armature 62 is also moved upward so that less of the Z armature 62 is in the vicinity of the lower Z core 50 and coil 56 and more of the Z armature 62 is in the vicinity of the upper Z core 50 and coil 56. The net effect of this change in reluctance is to unbalance the Z bridge circuit with the result that an output signal is produced. Similarly, if the tracing tip 40, as seen in FIGURE 1, is moved to the right, the air gap between the left-hand X armature 58 and its respective X core 50 is increased and the air gap between the right-hand X armature 58 and its respective X core 50 is decreased. Thus, a reluctance unbalance between the left-hand and the right-hand X magnetic circuits is provided to cause an output signal.

The stylus tracing tip 40 can be deflected in any direction in space with equal ease due to the spring suspension system design. This spring suspension system is designed so that the correct deflections are produced at each signal generating magnetic circuit air gap and so that the magnitude of the reluctance change represents the vectorial distance the stylus tracing tip 40 moved in each of the three mutually perpendicular X, Y and Z directions. This is made possible by the fact that the spring suspension system has a force versus deflection gradient that is equal in the three mutually perpendicular directions as measured at the stylus tracing tip 40. A motion of the tracing tip 40 in any direction in space is thereby converted into reluctance changes at each magnetic circuit which is proportional to the magnitude of the deflection (within reasonable limits of deflection) and to the angle or direction of motion of the tracing tip 40 with respect to each of the mutually perpendicular axes. The spring system accomplishes this trigonometric computation with a minimum of errors because there are no sliding parts in the suspension system to produce friction force errors. Thus, the force balance computations of the signal magnitudes of each of the mutually perpendicular magnetic circuit signal generators also have no error.

As will be appreciated by persons skilled in the art, the tracing device in accordance with the invention may be used in a number of different control systems, an example of such a control system being shown and taught by Branson in United States Patent No. 2,492,731, issued December 27, 1949. As shown by Branson, a control system may be operated or controlled by a tracing device which generates signals representative of movement in two mutually perpendicular directions. Thus, it will be seen that the tracing device of the present invention may be used in such a control system, and it will be further seen that any two of the magnetic circuits of the present invention may be used in such a control system. In such cases, it is sometimes desirable to disable the other magnetic circuit temporarily. And, since the tracing device in accordance with the invention simultaneously produces signals representative of three mutually perpendicular movements, such a tracing device can be used in control systems which are capable of responding to three changes of dimensions at the same time. Or, persons skilled in the art will appreciate that only one of the magnetic circuits of the tracing device may be utilized at any one time. In any case, while the invention has been described with reference to a particular embodiment, it is to be understood that modifications may be made by persons skilled in the art without departing from the spirit of the invention or from the scope of the claims.

What I claim as new and desire to secure by Letters Patent of the United States is:

1. A contour tracing device comprising a stylus, said stylus having a reduced area portion, a first signal generator circuit coupled to said stylus for producing signals in response to motion of said stylus on one side of said reduced area portion in two mutually perpendicular directions, and a second signal generator circuit coupled to said stylus for producing signals in response to motion of said stylus on both sides of said reduced area portion in a third direction that is mutually perpendicular to said two directions.

2. A contour tracing device comprising an elongated stylus having a reduced area portion, a first signal generator circuit coupled to said stylus on one side of said reduced area portion for producing first signals substantially only in response to motion of said stylus on the other side of said reduced area portion in directions transverse to the longitudinal axis of said stylus, and a second signal generator circuit coupled to said stylus on said one side of said reduced area portion for producing second signals substantially only in response to axial motion of said stylus on both sides of said reduced area portion, said first and said second signals being indepently produced by said first and said second generator circuits respectively.

3. A contour tracing device comprising an elongated stylus, said stylus having a reduced area portion separating said stylus into a first portion and a second portion, means fastened to and supporting said stylus to permit said second stylus portion to move in parallel and transverse directions with respect to the longitudinal axis of said stylus and to permit said first stylus portion to move substantially only in said parallel directions, a first signal generator circuit coupled to said first stylus portion for producing signals in response to motion of said second stylus portion in said transverse directions, and a second signal generator circuit coupled to said first stylus portion for producing signals in response to motion of said second stylus portion in said parallel directions.

4. A contour tracing device comprising an elongated stylus having a reduced area portion separating said stylus into a first portion and a second portion, means fastened to and supporting said first stylus portion to permit said second stylus portion to move in parallel and transverse directions with respect to the longitudinal axis of said stylus and to permit said first stylus portion to move substantially only in said parallel directions, a first signal generator circuit coupled to said first stylus portion for producing signals substantially only in response to motion of said second stylus portion in said transverse directions, and a second signal generator circuit coupled to said first stylus portion for producing signals substantially only in response to motion of said second stylus portion in said parallel directions.

5. A contour tracing device comprising an elongated stylus divided into first and second parts by a reduced area portion, means fastened to said stylus for supporting said stylus and for permitting said first part to move in parallel directions with respect to the longitudinal axis of said stylus, a first magnetic circuit positioned in the vicinity of said first part of said stylus, a first armature arrangement fastened to said first part of said stylus and movable therewith to change the reluctance of said first magnetic circuit in response to motion of said stylus in parallel directions with respect to said longitudinal axis, a second magnetic circuit positioned in the vicinity of said first part of said stylus, and a second armature arrangement fastened to said second part of said stylus and movable therewith to change the reluctance of said magnetic circuit in response to motion of said stylus in transverse directions with respect to said longitudinal axis.

6. A contour tracing device comprising an elongated stylus having a portion thereof reduced in cross-sectional area to divide said stylus into first and second parts, means fastened to said first part of said stylus for supporting said stylus and for permitting said first part to move substantially only in parallel directions with respect to the longitudinal axis of said stylus and for permitting said second part of said stylus to move in both parallel and transverse directions with respect to said longitudinal axis, a first magnetic circuit positioned in the vicinity of said first part of said stylus, a first armature arrangement fastened to said first part of said stylus and movable therewith to change the reluctance of said first magnetic circuit in response to motion of said stylus in parallel directions with respect to said longitudinal axis, a second magnetic circuit positioned in the vicinity of said reduced portion of said stylus, and a second armature arrangement fastened to said second part of said stylus and movable therewith to change the reluctance of said second magnetic circuit substantially only in response to motion of said stylus in transverse directions with respect to said longitudinal axis.

7. A contour tracing device comprising an elongated stylus divided into first and second parts by a reduced area portion, means fastened to said first part of said stylus for supporting said stylus and for permitting said first part to move substantially only in parallel directions with respect to the longitudinal axis of said stylus and for permitting said second part of said stylus to move in both parallel and transverse directions with respect to said longitudinal axis, a first magnetic circuit positioned in the vicinity of said first part of said stylus and substantially immovable with respect to said first part of said stylus, a first armature arrangement fastened to said first part of said stylus and movable therewith to change the reluctance of said first magnetic circuit substantially only in response to motion of said stylus in parallel directions with respect to said longitudinal axis, a second magnetic circuit fastened to said first part of said stylus and movable therewith, and a second armature arrangement fastened to said second part of said stylus and movable therewith to change the reluctance of said second magnetic circuit substantially only in response to motion of said stylus in transverse directions with respect to said longitudinal axis.

8. A contour tracing device comprising an elongated stylus having a portion thereof reduced in cross-sectional area to divide said stylus into first and second parts and to permit said first and said second parts of said stylus to be independently moved in transverse directions with respect to the longitudinal axis of said stylus, a pair of cantilever spring elements fastened to said first part of said stylus for supporting said stylus and for permitting said first part of said stylus to move substantially only along said longitudinal axis of said stylus and for permitting said second part of said stylus to move along said longitudinal axis and transversely to said longitudinal axis, a first magnetic circuit comprising a first coil wound on a first core immovably positioned with respect to and in the vicinity of said first part of said stylus, a first armature fastened to said first part of said stylus and movable therewith in the vicinity of said first core for changing the reluctance of said first magnetic circuit to thereby produce first signals in response to motion of said stylus along said longitudinal axis, a second magnetic circuit comprising a second coil wound on a second core and a third coil wound on a third core, said second and said third coils and their respective cores being fastened to said first part of said stylus in a space quadrature relationship, second and third armatures fastened to said second part of said stylus and movable therewith in the vicinity of said second and said third cores for changing the reluctance of said second magnetic circuit to thereby produce second signals substantially only in response to motion of said stylus in directions transverse to said longitudinal axis.

References Cited in the file of this patent

UNITED STATES PATENTS

| | | |
|---|---|---|
| 2,839,733 | Bassett | June 17, 1958 |
| 2,937,577 | Morgan | May 24, 1960 |

FOREIGN PATENTS

| | | |
|---|---|---|
| 512,234 | Great Britain | Aug. 30, 1939 |

UNITED STATES PATENT OFFICE
CERTIFICATE OF CORRECTION

Patent No. 3,122,970 March 3, 1964

John M. Rhoades

It is hereby certified that error appears in the above numbered patent requiring correction and that the said Letters Patent should read as corrected below.

Column 2, line 25, for "springlike" read -- spring-like --; column 5, line 69, for "uper" read -- upper --; column 7, line 56, after "said" insert -- second --.

Signed and sealed this 15th day of September 1964.

(SEAL)
Attest:

ERNEST W. SWIDER
Attesting Officer

EDWARD J. BRENNER
Commissioner of Patents